(No Model.) 2 Sheets—Sheet 1.

E. A. BREDENBERG.
SHAFT BEARING.

No. 456,299. Patented July 21, 1891.

Witnesses:
Inventor:
Edward Achilles Bredenberg
By Henry Connett
Atty (No Model.) 2 Sheets—Sheet 2.

E. A. BREDENBERG.
SHAFT BEARING.

No. 456,299. Patented July 21, 1891.

Witnesses: Inventor:
Edward Achilles Bredenberg
By Henry Connett
Atty

UNITED STATES PATENT OFFICE.

EDUARD ACHILLES BREDENBERG, OF SUNDSVALL, SWEDEN.

SHAFT-BEARING.

SPECIFICATION forming part of Letters Patent No. 456,299, dated July 21, 1891.

Application filed February 7, 1891. Serial No. 380,685. (No model.)

*To all whom it may concern:*

Be it known that I, EDUARD ACHILLES BREDENBERG, a subject of the King of Sweden, residing at Sundsvall, Sweden, have invented certain Improvements in Shaft-Bearings, of which the following is a specification.

My invention relates to improvements in ball-bearings such as are employed for rotating shafts; and the object of my invention is to provide a bearing of this general character which shall be of a simple and inexpensive construction, and wherein provision is made for certain irregularities in movement—such as the lifting or bending of the rotating shaft—without imparting undue strain to the bearing-brackets.

My invention also contemplates means for taking up looseness resulting from wear, so that the bearing may be used for a considerable time without the necessity of replacing the bearing blocks and surfaces.

Figure 1:
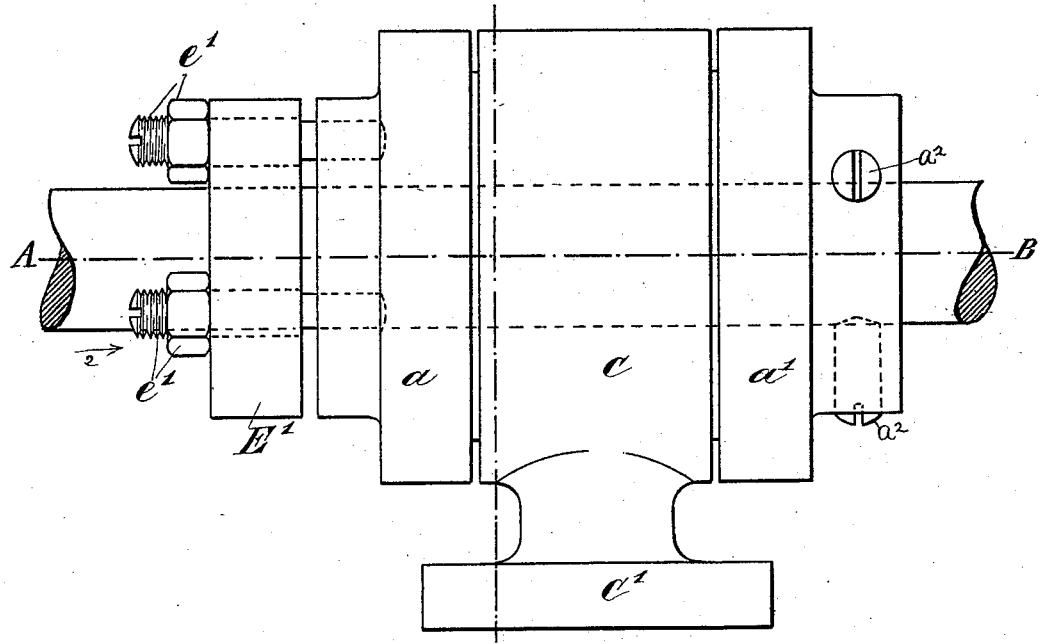
Figure 3:
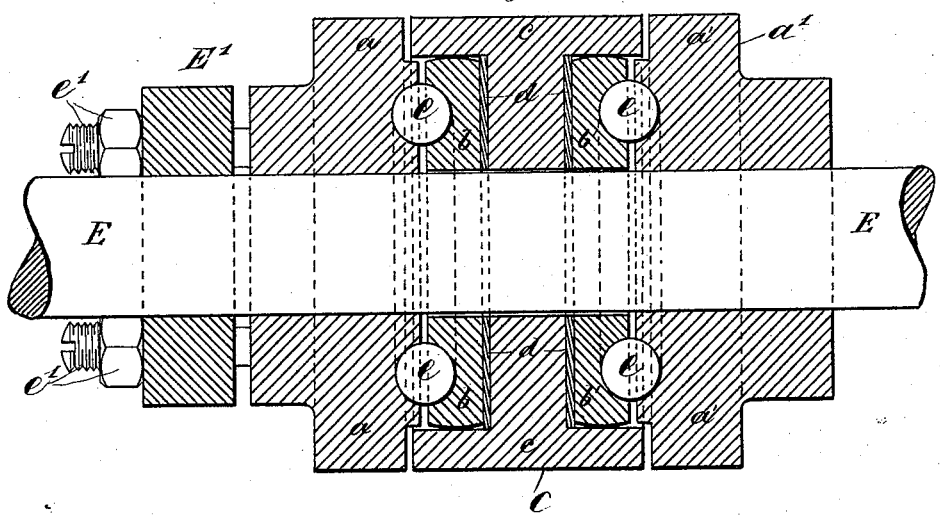
Figure 2:
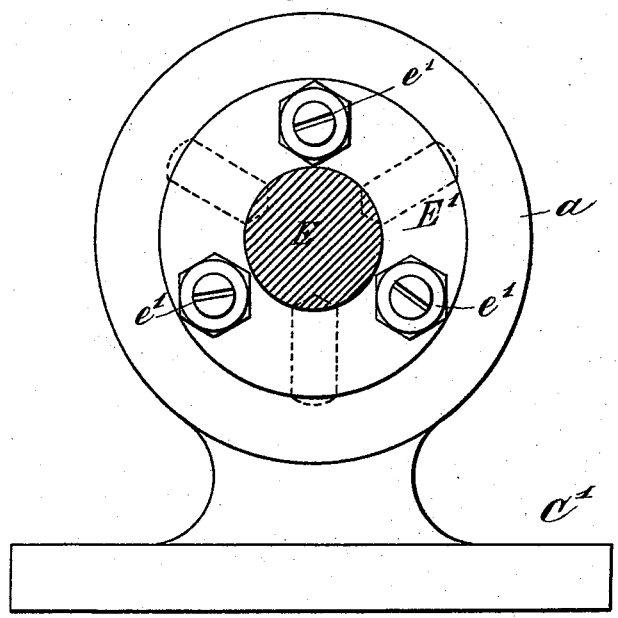
Figure 4:
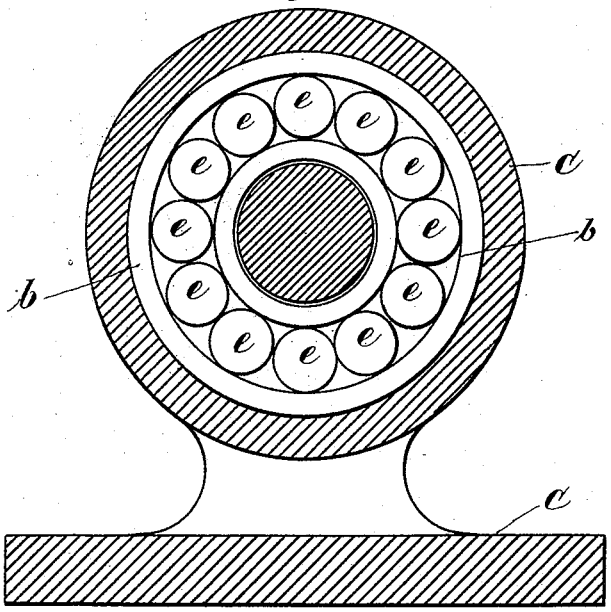

In the accompanying drawings, which serve to illustrate my invention, Figure 1 is a side view of a shaft-bearing constructed according to my invention; and Fig. 2 is an end view of the same, looking in the direction indicated by arrow 2 in Fig. 1. Fig. 3 is a horizontal longitudinal section of the bearing, taken in the plane indicated by the line A B in Fig. 1, the bearing being represented as applied to a horizontal shaft or vehicle-axle, which latter is in elevation. Fig. 4 is a view of the central bearing-block, taken along line C D in Fig. 1, looking in the same direction as in Fig. 2, the end collar being removed to show the metallic balls or spheres.

In the views, E represents the rotating shaft, and C is the main bearing block or hanger, which is secured to the ceiling or other fixed part in the case of a shaft for machinery or to the wagon-bed in the case of a vehicle-axle by means of bolts passing through its base $C'$. This block is bored at its center for the passage of the shaft E, and is hollowed out on its opposite faces about the edges of the shaft-opening, and these hollows are countersunk to a sufficient depth to each receive a layer of rubber or other elastic packing $d$, and in contact with this packing there are circular plates $b\ b'$, each of which is grooved on its outer surface to provide a path for the balls to move in as the shaft turns. On the shaft E is shrunk a stout ring or band $E'$, which rotates therewith, and this band is provided with three or more equally-spaced adjusting-screws $e'$, which bear at their opposite ends against a bearing-collar $a$, which is slipped upon the shaft and fits thereabout quite snugly by preference. On the opposite side of the block C a collar $a'$, similar to collar $a$, is slipped about the shaft, and, like the latter, fits quite snugly about the shaft. In the inner faces of these collars $a$ and $a'$ are formed annular grooves, corresponding in size and depth to the grooves in the plates $b\ b'$. These grooves conform in cross-section to the cross-section of the balls $e$, but are preferably not quite semicircular in cross-section, but allow a little space between the two plates for adjustment to take up wear.

In assembling the parts of my improved bearing the collar $a$ is slipped up against the ends of screws $e'$, these latter being well drawn out, and the bearing-plate $b$ is slipped about the shaft E and well up to plate $a$, the balls $e$ being interposed. The bearing-block C is now slipped about the shaft E, the packing-rings $d$ being previously put in place and pressed up over plate $b$. The plate $b'$ at the opposite side of the block is now introduced into the countersunk hollow on the opposite face of block C, and the collar $a'$ for that side of the bearing is slipped about the shaft and up to said plate, the balls being in place, and is set in this position by means of set-screws $a^2$, which pass through it and abut against the shaft E.

In the drawings I have represented the ring or collar $a'$ as provided with three screws $a^2$ equally spaced; but any number may of course be employed. Thus it will be seen that the shaft E is supported out of contact with any bearing-surface whatever, and consequently there will be no wear at any point but at the grooves, in which the balls $e$ roll. In order to compensate for all movements of the shaft E other than its rotatory movement in the bearing, which movements would tend to strain the bearing-block C unduly, I prefer to round the outer edges of plates $b\ b'$. Thus it will be seen that any such movement of shaft E will be compensated for by the tilting of plates $b\ b'$, together with those parts of the bearing which are secured fixedly on shaft E, the rounded edges and packing-rings $d$, together with the space between shaft E and bearing-bracket C, allowing by the difference in their diameters said plates to turn slightly in their recesses in the sides of block C. This construction will also compensate for any difference which may exist between the diameters of the balls $e$. In the course of time the balls will wear somewhat in their grooves and work loose; but this looseness may be taken up from time to time by means of the screws $e'$. A turn upon each of these screws will press the plates $a$ and $b$ together, and thereby take up any looseness.

My bearing has great advantages over ball-bearings as heretofore constructed, in that it is very simple and inexpensive in construction and effectually decreases the wear of the shaft in its bearings, and that it provides means for taking up looseness from time to time.

Where the bearing is to be used for a vertical shaft, it will be readily seen that the lower plates $b'\ a'$, with their balls $e$, may be dispensed with, as may likewise the adjusting means—that is, the ring E' and screws $e'$—the collar $a$ being shrunk directly on the shaft E.

Having thus described my invention, I claim—

In a ball-bearing for shafts, the combination, with the shaft E, of the bearing-block C, recessed on its opposite faces about the opening for shaft E, the packing-rings arranged in said recesses, and the grooved bearing-plates $b\ b'$, arranged in said recesses above said packing-rings, the grooved collars $a\ a'$, set on said shaft on opposite sides of said block C, and the balls $e$, arranged in the grooves in the bearing surfaces and collars, said grooves coinciding when the parts are assembled, the said plates $b\ b'$ being rounded at their outer edges where they bear against the block C, whereby any movement of shaft E other than its rotary movement is compensated for, substantially as set forth.

In witness whereof I have hereunto signed my name in the presence of two subscribing witnesses.

EDUARD ACHILLES BREDENBERG.

Witnesses:
LARS ROMELL,
M. STENQUIST.